United States Patent
Scherer

(10) Patent No.: US 6,634,570 B2
(45) Date of Patent: Oct. 21, 2003

(54) SPRAY GUN

(75) Inventor: Oswald Scherer, Lahnau (DE)

(73) Assignee: WiWa Wilhelm Wagner GmbH & Co. KG, Lahnau (DE)

( * ) Notice: Subject to any disclaimer, the term of this patent is extended or adjusted under 35 U.S.C. 154(b) by 0 days.

(21) Appl. No.: 09/964,074

(22) Filed: Sep. 26, 2001

(65) Prior Publication Data

US 2002/0113146 A1 Aug. 22, 2002

(30) Foreign Application Priority Data

Feb. 16, 2001 (DE) .................. 201 02 842 U

(51) Int. Cl.[7] .............. B05B 15/02; F23D 11/34; F23D 11/38; F23D 14/50
(52) U.S. Cl. ............ 239/117; 239/114; 239/123; 239/403; 239/419; 239/526
(58) Field of Search ............... 239/117, 123, 239/106, 114–116, 525–526, 654, 407–408, 417.5, 419, 421, 543, 545, 403–404, 110

(56) References Cited

U.S. PATENT DOCUMENTS

| | | | | |
|---|---|---|---|---|
| 1,929,348 A | * | 10/1933 | Cathcart | 239/110 |
| 2,890,836 A | * | 6/1959 | Gusmer et al. | 239/117 |
| 3,263,928 A | * | 8/1966 | Gusmer | 239/123 |
| 3,554,450 A | * | 1/1971 | D'Muhala | 239/309 |
| 4,377,256 A | * | 3/1983 | Commette et al. | 239/117 |
| 4,427,153 A | * | 1/1984 | Schaefer | 239/117 |
| 4,471,887 A | * | 9/1984 | Decker | 222/135 |
| 4,899,912 A | * | 2/1990 | Pontius et al. | 222/145.2 |
| 5,074,470 A | * | 12/1991 | Rosenplanter et al. | 239/116 |
| 5,104,006 A | * | 4/1992 | Brown | 222/145.1 |
| 5,299,740 A | * | 4/1994 | Bert | 239/117 |
| 5,829,679 A | * | 11/1998 | Strong | 239/117 |

FOREIGN PATENT DOCUMENTS

| | | |
|---|---|---|
| DE | 22 01 903 | 9/1972 |
| DE | 32 07 828 | 9/1982 |

* cited by examiner

*Primary Examiner*—Michael Mar
*Assistant Examiner*—Darren Gorman
(74) *Attorney, Agent, or Firm*—Flynn, Thiel, Boutell & Tanis, P.C.

(57) ABSTRACT

A spray gun for spraying of abrasive media includes a valve operable by a nozzle needle. The valve is arranged in a gun head and has a nozzle opening. The spray gun has an operating and return device for the nozzle needle. In order for the spray gun to be self-cleaning and to be able to process several components with abrasive material, the valve includes a nozzle channel, which ends in the nozzle opening. The nozzle needle is movably supported in the nozzle channel. At least one bore laterally enters the nozzle channel to supply the media. The bore can be closed off by the nozzle needle, which has an outer diameter almost equal to an inner diameter of the nozzle channel. The length of the nozzle needle in chosen so that when the nozzle needle is in a resting state, the needle extends at least to the nozzle opening of the spray gun.

18 Claims, 5 Drawing Sheets

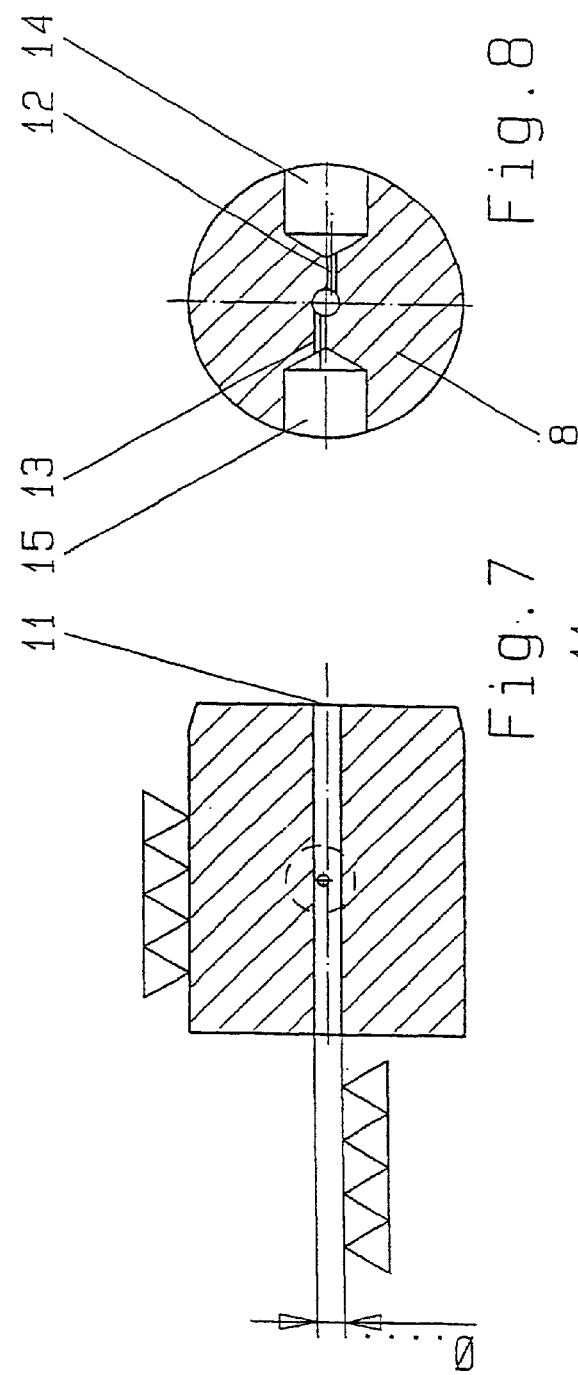

SPRAY GUN

FIELD OF THE INVENTION

The invention relates to a spray gun in particular for the spraying of abrasive media, or rather media to which abrasive materials have been added, comprising a valve that is operable by means of a nozzle needle, which valve is arranged in the gun head near the outlet opening for the media, and comprising an operating and return device for the nozzle needle.

BACKGROUND OF THE INVENTION

Spray guns of the abovementioned type are known, whereby these as a rule are used to process 2-component lacquers or other materials, to which as a rule abrasive particles are additionally added, for example, to apply an under-bottom carriage protection onto vehicles, or to process 2-component polyurethane lacquers. It is known that the processing time, potlife, of these lacquers is relatively short so that they can be mixed only shortly prior to the spraying. A problem when using the spray guns for such lacquers is that the spray guns must be cleaned with solvents after the work has been done, in order to prevent a hardening of the already mixed lacquers still in the gun which is time-consuming and expensive. Solvent channels for this purpose are, as a rule, provided in the spray gun, through which channels, by supplying solvents, the material of the two components already mixed in the spray gun is washed out. When fully carried out, this process also requires, as a rule, a disassembly of the nozzle system being used.

In order to keep the mixing channel for the two or more components relatively short, it is known to supply the individual components just shortly in front of the nozzle outlet. Achieving a satisfactory mixing of the components in the remaining short channel is a problem. The valve is as a rule operated by pressure-air-operated nozzle needles, which makes the spray gun not only awkward to handle but moreover also expensive.

SUMMARY OF THE INVENTION

The basic purpose of the invention is to provide a spray gun of the abovementioned type in such a manner that it is self-cleaning, can process several components with abrasive material, is inexpensive to manufacture, and is light and thus easy to operate.

This purpose is attained according to the invention by the nozzle having a channel that ends in the outlet opening of the spray gun, in which channel the nozzle needle is moveably supported. The channel has at least one bore that laterally enters the channel and is utilized for supplying the media. The bore can be closed off by the nozzle needle, which has a diameter chosen to match the diameter of the channel. The length of the nozzle needle is chosen such that when the nozzle needle is in a resting position, it terminates at least at the outlet opening of the spray gun.

This nozzle needle, which is spring-loaded, is thus moved in the resting position at least into the plane of the outlet opening so that all of the material already mixed in the channel of the nozzle is moved out of the nozzle. Since the diameters of the nozzle needle and the channel are the same, not only are the bores for the supply of the media tightly closed off when the nozzle needle is moved to the resting position, but moreover, all mixed material is removed from the channel. No solvents whatsoever are needed for cleaning the spray gun. The spray gun is self-cleaning since, upon the conclusion of each spraying process, the spray gun automatically cleans itself by means of the nozzle needle.

The nozzle is manufactured of a hard metal so that it is insensitive to abrasive material, thus the self-cleaning and well sealing action of the nozzle is completely maintained even after extended use. A nozzle of a ceramic material is also particularly advantageous.

In order to achieve an exact mixing of the two media, the bores through which the media are separately supplied, lie advantageously in one plane and are oriented perpendicular to the channel, whereby the diameters of the bores are smaller than the diameter of the channel. Furthermore, the bores are elevationally offset from one another so that when media is sprayed into the channel a turbulent zone is constructed, which results in a complete mixing of the media in the short path.

The nozzle needle is loaded by a spring, which moves the needle into the closed position when the operating lever is released.

The nozzle is advantageously arranged in an insert piece, in which bores for lines which supply the media are arranged. These lines are connected directly to the nozzle, whereby these lines are advantageously pivotal relative to the nozzle and thus to the insert This further improves the handling ability of the spray nozzle.

To allow for production of a broad spray, the outlet opening of the nozzle is followed by a slot-shaped enlarging opening. In addition, the outlet opening of the nozzle is oval shaped, and the larger axis of the oval opening is advantageously arranged perpendicularly with respect to the slot-shaped opening. This results in an even spray projection extending over a large distance.

The nozzle needle is advantageously connected to an operating rod which is loaded by the pressure spring The operating lever of the spray gun has an abutment, which cooperates with a shoulder of the operating rod so that the spray gun can be easily manually operated, and does not require any expensive additional energies, like pressure air, etc. for its use.

BRIEF DESCRIPTION OF THE DRAWINGS

One exemplary embodiment of the invention will be described in greater detail hereinafter in connection with the drawings, in which:

FIG. 6 is a side view of a nozzle, FIG. 7 is a cross-sectional view along the line VII—VII of FIG. 6, and FIG. 8 is a cross-sectional view along the line VIII—VIII of FIG. 6.

DETAILED DESCRIPTION

Figure 1:
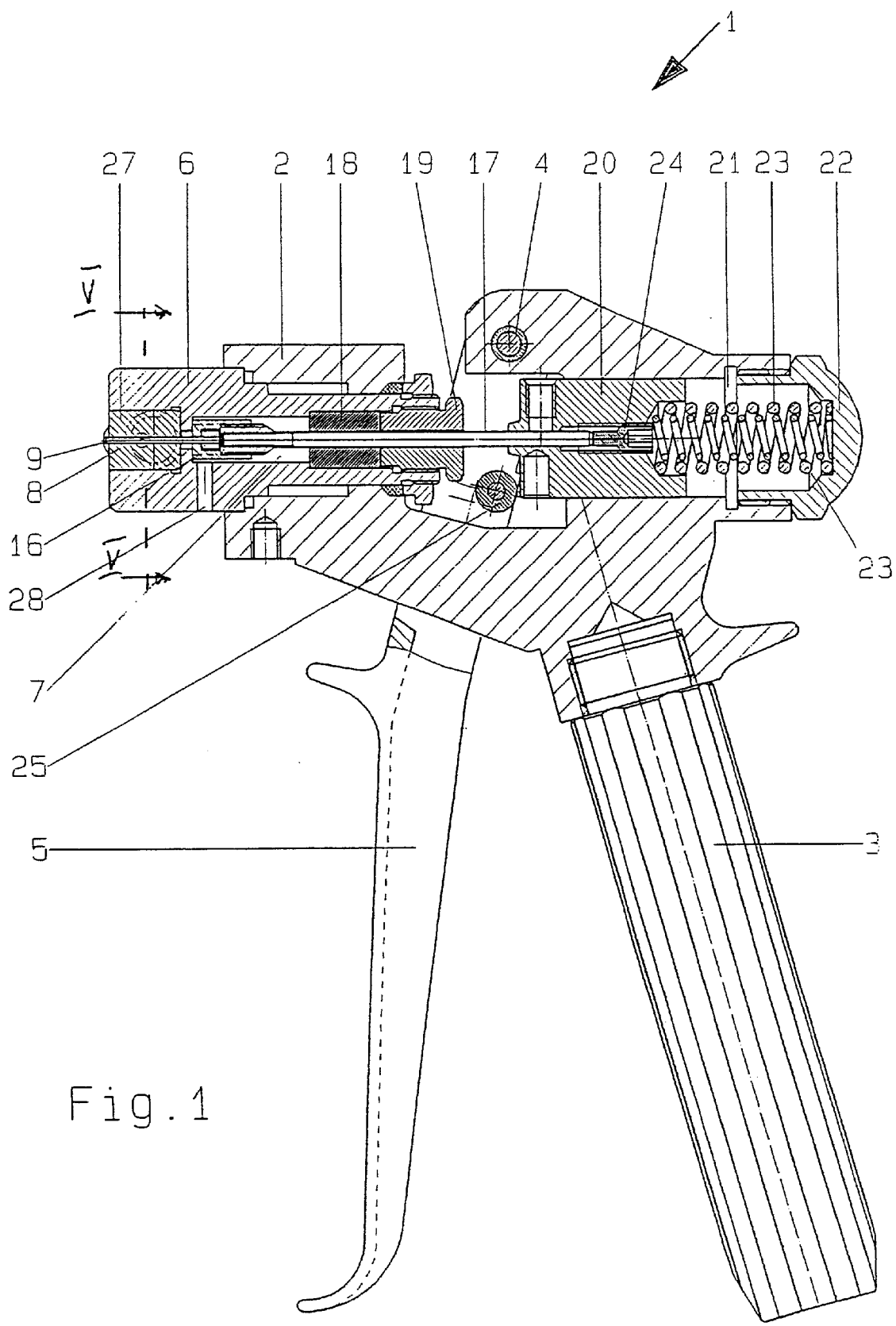
FIG. 1 illustrates a spray gun of the invention, partially in cross section.

FIG. 1 illustrates the spray gun in a side view, partially in cross section. The spray gun 1 consists of a gun head 2, a handle 3 and a trigger 5 that can pivot about an axis 4 in the gun head 2. An insert 6 is inserted into the gun head 2 of the spray gun 1, which insert 6 has a bore 7. A valve 8 is inserted into said bore 7, which valve 8 has a continuous nozzle channel 9. A nozzle needle 10, made out of a hard metal, is inserted into the nozzle channel 9. When the spray gun 1 is not in operation, the nozzle needle 10 projects beyond a nozzle opening 11 of the nozzle channel 9.

Figure 5:
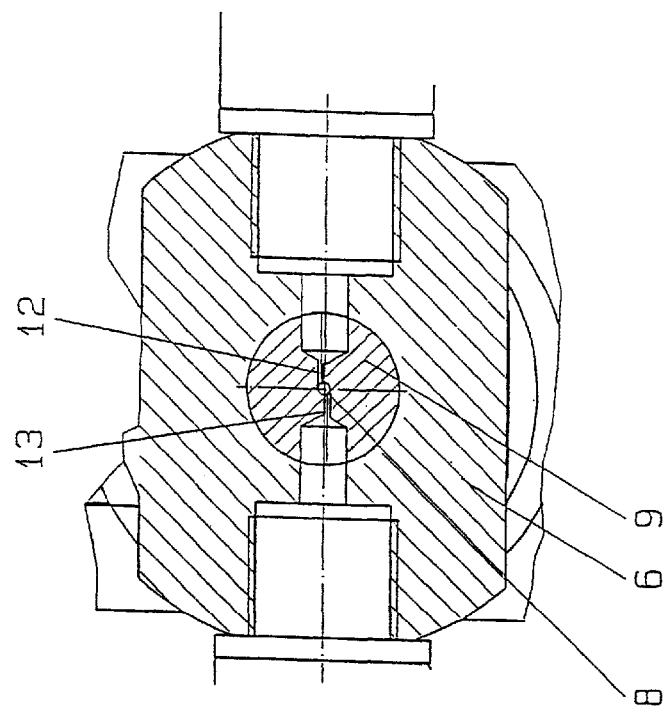
FIG. 5 is a cross-sectional view along the line V—V of FIG. 1.
Figure 4:
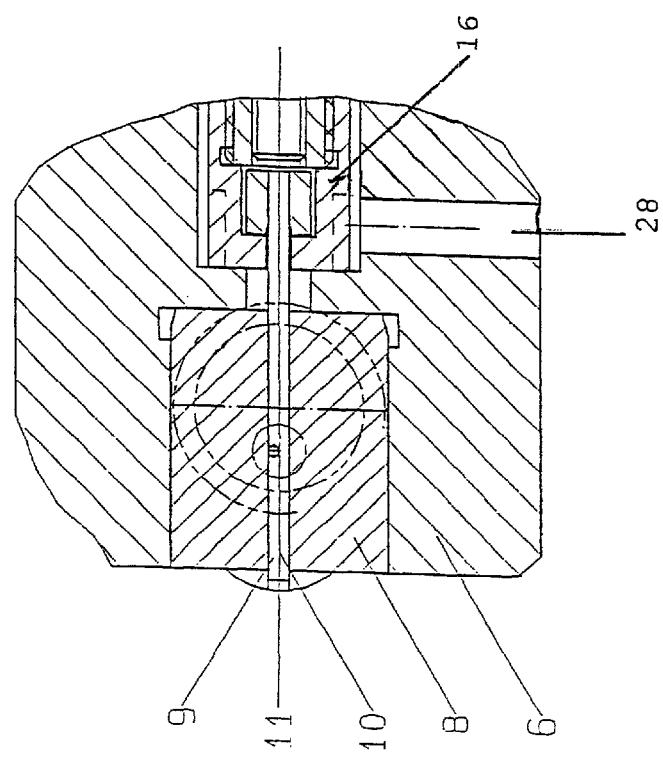
FIG. 4 is an enlarged illustration of the front end of the spray gun.

The design of the valve 8 can be seen in FIGS. 4 to 8. The valve 8 is pressed into the insert 6 and consists of a ceramic material which is subjected to a low mechanical wear. Two bores 12, 13 extend perpendicular to the nozzle channel 9, lie on opposite sides thereof in one plane, as can be seen, for example, in FIG. 6, and terminate in the nozzle channel 9. These two bores 12, 13 are elevationally axially offset from one another, as is best seen in FIGS. 5 and 8. Due to the two bores being arranged in one plane and axially offset from one another, an intensive mixing of the media supplied through the connections 14, 15 is obtained This makes it possible to supply the media just before the nozzle opening 11.

There is a very narrow clearance between the nozzle needle and the nozzle channel, which clearance between the nozzle needle and the bore should not be greater than +/−1 µm. This achieves on the one hand a tight seal of the bores 12, 13 when the nozzle needle is moved in. Moreover, since the nozzle needle extends to, or beyond, the nozzle opening when it is in the resting state, the already mixed media are likewise moved out of the nozzle channel 9 so that a fully sufficient mechanical cleaning is effected during operation, and thus a cleaning by solvents is not needed. Moreover, disassembly of the nozzle for a cleaning is also not necessary. This arrangement assures that, when the spray gun is turned off, a simultaneous cleaning of the same occurs.

The nozzle needle 10 is fastened in a needle holder 16, to the other end of which is attached an operating rod 17. The operating rod is supported in a guideway 18 in the gun head 2, which guideway 18 is held in the head with a sleeve 19.

The other end of the operating rod 17 is fastened in a block 20 which is movably supported in a bore 21 of the gun head. The bore 21 is closed off by a lid 22 at its rear end, whereby a pressure spring 23 is supported between the lid 22 and the block 20. The initial tension of the spring 23 can be adjusted by means of a setscrew 24 that is inserted in the block 20.

Figure 2:
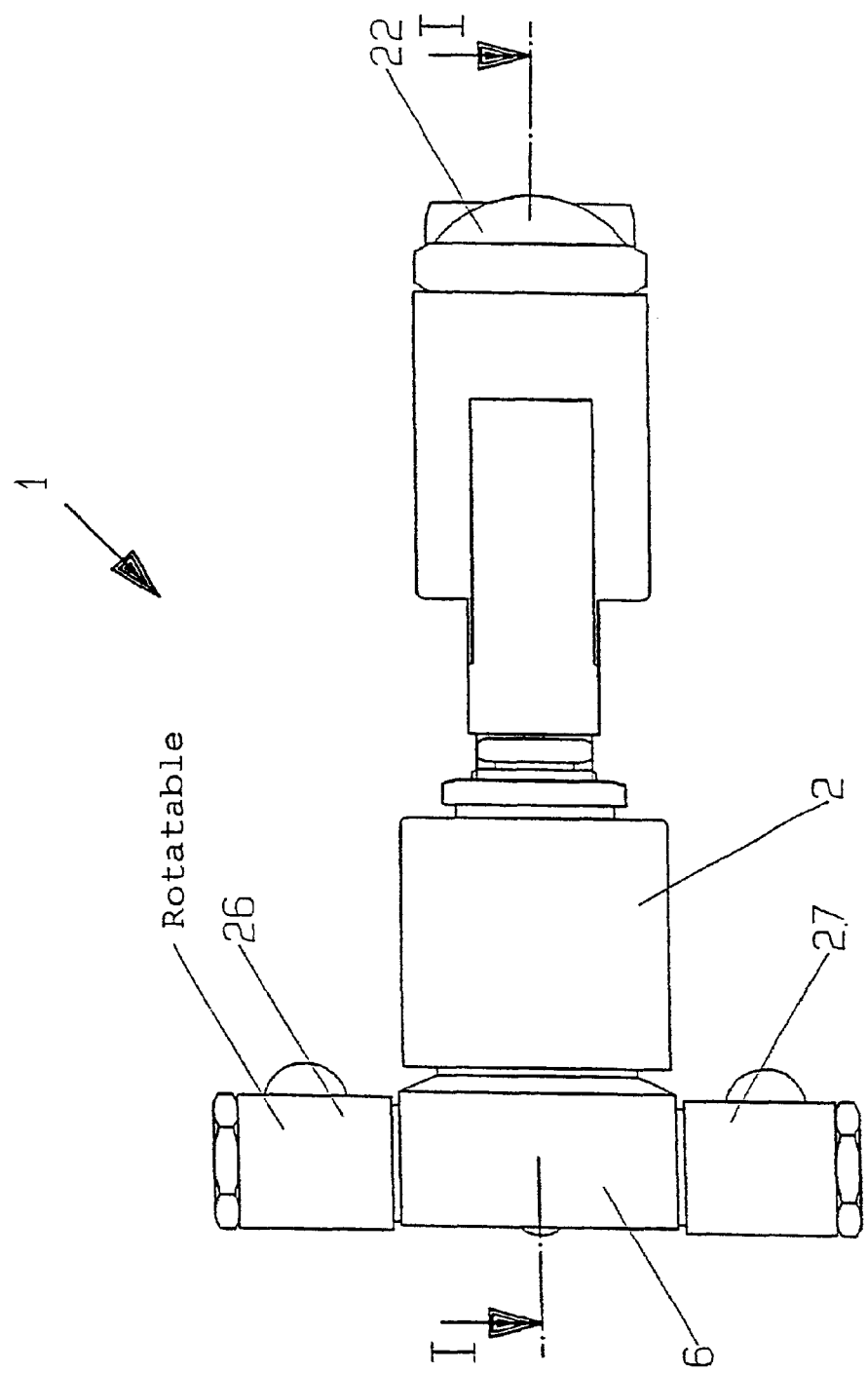
FIG. 2 is a top view of the spray gun according to FIG. 1.
Figure 3:
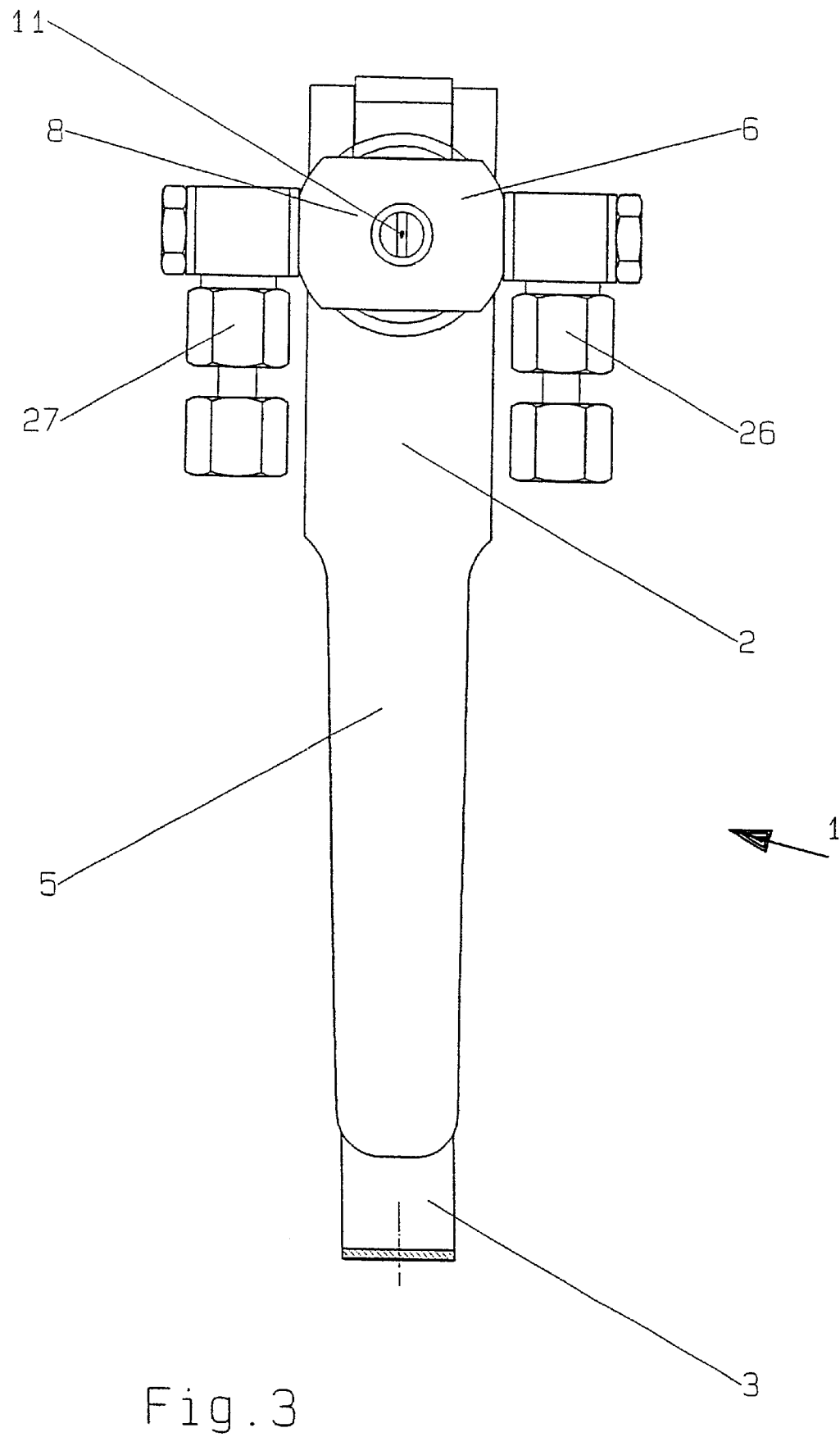
FIG. 3 is a front view of the spray gun according to FIG. 1.

An abutment 25 is fastened on the trigger 5, which abutment 25 cooperates with the block 20 and moves the same upon operation of the trigger 5, and compresses the pressure spring and thus increases tension in the spring. When releasing the trigger 5, the block 20, the operating rod 17, and thus the nozzle needle 10, are pressed forwardly so that the bores 12, 13 are closed and the nozzle channel 9 is cleaned The trigger gun has a very simple design and is thus of a light weight so that it can be easily handled. As shown in FIG. 2, the two supply lines 26, 27 are held pivotally on the insert 6 and are thus also pivotal with respect to the spray gun so that the supply lines do not negatively influence the handling of the spray gun.

The spray gun of the invention is built out of few individual parts. The insert 6 is merely screwed into the gun head, and the operating rod that includes the guideway is held by means of a sleeve.

At the rear end of the needle channel 10, namely in the area into which valve 8 does not extend, a leakage channel 28 is arranged in the insert 6, through which any accumulated fluids can drain off.

What is claimed is:

1. A spray gun for spraying at least one of abrasive media and media to which abrasive material has been added, comprising a valve arranged in a gun head having a nozzle and an oval-shaped nozzle opening and operable by a nozzle needle, the nozzle having a nozzle channel ending in the nozzle opening, the nozzle needle being movably supported in the nozzle channel, the nozzle having at least one bore laterally entering said nozzle channel that is utilized for supplying the media, said at least one bore capable of being closed off by the nozzle needle, said nozzle needle having a diameter slightly less than the inner diameter of the nozzle channel, and the length of said nozzle needle being chosen such that when said nozzle needle is in a resting state, a first end of said nozzle needle ends at least to the nozzle opening of said spray gun;

an insert for receiving said valve, wherein lines for supplying the media are connected to at least one of the valve and the insert, the insert having a leakage channel, wherein the nozzle needle is connected at a second end to an operating rod supported in a guideway of the insert and biased by a spring, the guideway being in alignment with the nozzle opening and the nozzle channel; and wherein an abutment is secured to a trigger, which abutment cooperates in combination with the operating rod, the guideway, the spring and the trigger to provide an operating and return device for the nozzle needle.

2. The spray gun according to claim 1, wherein at least one of the valve and the nozzle needle comprises a hard metal or a ceramic material.

3. The spray gun according to claim 1, wherein the nozzle includes a second bore and the bores lie in the same plane and extent perpendicularly with respect to the nozzle channel.

4. The spray gun according to claim 3, wherein the diameter of each said bore is smaller than the diameter of the nozzle channel, and the axes of the bores are axially offset from one another.

5. The spray gun according to claim 1, wherein the spring presses the nozzle needle into a closed position.

6. The spray gun according to claim 5, wherein the trigger is manually operated to move the nozzle needle against the force of the spring into an open position.

7. The spray gun according to claim 1, wherein the lines are pivotally secured.

8. The spray gun for spraying at least one of abrasive media and media to which abrasive material has been added, comprising:

an insert secured in a gun head end of said spray gun, a first end of said insert having a first insert bore with a given diameter and a second end of said insert having a second insert bore forming a guideway, said insert having a small open aperture connecting said first insert bore and said second insert bore;

a valve received in the first insert bore of said insert, said valve including a nozzle opening and a corresponding nozzle channel extending therethrough and ending at the nozzle opening, the valve including a valve bore communicating with the nozzle channel;

an operating rod having a needle holder at a first end thereof, said operating rod being positioned in the guideway and having a second end extending inwardly into an aperture of a support block of said spray gun;

a spring secured to said spray gun and biasing said operating rod toward said valve and said insert; and a nozzle needle secured to said needle holder at the first end of said operating rod, said nozzle needle aligned to project through the small open aperture of said insert and into said nozzle channel of said valve; and a trigger for moving said operating rod and said nozzle needle secured thereto;

wherein when said spring biases said operating rod toward said valve and insert in a rest position, said nozzle needle extends through said nozzle channel at least to the nozzle opening of said valve so that said valve is closed, and wherein when said trigger moves said nozzle needle away from said nozzle opening the valve is opened and at least one of the abrasive media and the media having abrasive material added therein egresses from said nozzle opening.

9. The spray gun according to claim 8, wherein the valve bore comprises a first valve bore, the valve including a second valve bore communicating with said nozzle channel, the first and second valve bores being capable of receiving at least one of the abrasive media and the media to which abrasive material has been added for egress from said nozzle opening.

10. The spray gun according to claim 9, wherein the first and second valve bores extend perpendicularly with respect to the nozzle channel and the diameter of each of the valve bores is less than the diameter of the nozzle channel.

11. The spray gun according to claim 10, including a leakage channel formed in the insert, said leakage channel not being directly connected to the nozzle channel.

12. The spray gun according to claim 8, including a leakage channel formed in the insert.

13. The spray gun according to claim 11, wherein said leakage channel opens into the second insert bore.

14. The spray gun according to claim 8, wherein said nozzle channel has a constant diameter along the entire length thereof.

15. The spray gun according to claim 8, wherein at least one of said valve and nozzle needle comprises a hard metal or a ceramic material.

16. The spray gun according to claim 8, wherein said nozzle opening comprises an oval-shaped nozzle opening.

17. The spray gun according to claim 9, including first and second lines pivotally secured to said insert for supplying the media through the first and second valve bores to egress from the nozzle opening.

18. The spray gun according to claim 8, including a handle, wherein movement of said trigger toward said handle moves said nozzle needle away from said nozzle opening to enable at least one of said abrasive media and said media having abrasive material added therein to egress from said nozzle opening.

* * * * *